United States Patent
Vander Mey

(10) Patent No.: US 9,824,335 B1
(45) Date of Patent: Nov. 21, 2017

(54) INTEGRATED CALENDAR AND CONFERENCE APPLICATION FOR DOCUMENT MANAGEMENT

(75) Inventor: Christopher David Vander Mey, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/526,247

(22) Filed: Jun. 18, 2012

Related U.S. Application Data

(60) Provisional application No. 61/497,902, filed on Jun. 16, 2011.

(51) Int. Cl.
*G06Q 10/10* (2012.01)

(52) U.S. Cl.
CPC ....... *G06Q 10/1095* (2013.01); *G06Q 10/103* (2013.01)

(58) Field of Classification Search
CPC ............ G06F 17/3089; G06Q 10/1095; G06Q 10/103
USPC .............................. 707/608, 999.01, 999.107
See application file for complete search history.

(56) References Cited

U.S. PATENT DOCUMENTS

| | | | |
|---|---|---|---|
| 6,101,480 A | 8/2000 | Conmy et al. | |
| 6,502,127 B1 | 12/2002 | Edwards et al. | |
| 6,724,764 B2 | 4/2004 | Bondarenko et al. | |
| 6,856,962 B2 | 2/2005 | Yonemitsu | |
| 7,251,320 B1 | 7/2007 | Todd | |
| 7,308,090 B2 | 12/2007 | White et al. | |
| 7,343,312 B2 | 3/2008 | Capek et al. | |
| 7,389,473 B1 * | 6/2008 | Sawicki et al. | 715/255 |
| 7,398,294 B2 | 7/2008 | Florkey et al. | |
| 7,669,115 B2 * | 2/2010 | Cho et al. | 715/212 |
| 7,676,542 B2 * | 3/2010 | Moser | G06Q 10/107 709/204 |
| 7,756,816 B2 * | 7/2010 | Scott | |

(Continued)

FOREIGN PATENT DOCUMENTS

| | | |
|---|---|---|
| WO | 2004073288 A2 | 8/2004 |
| WO | 2011137295 A2 | 11/2011 |

OTHER PUBLICATIONS

Notice of Allowance dated Sep. 2, 2015 in U.S. Appl. No. 13/526,355.

(Continued)

*Primary Examiner* — Miranda Le
(74) *Attorney, Agent, or Firm* — IP Spring

(57) ABSTRACT

Techniques presented herein provide techniques for integrating one or more documents for a communication session in a calendar application. In one example, a computing device retrieves a meeting appointment in a calendar application executed by the computing device for a meeting via a communication session, wherein the meeting appointment includes identifying information of one or more invitees and for the communication session, wherein the communication session enables communication between different computing devices. At least one document associated with the communication session is identified. The document is linked with the meeting appointment such that a centralized version of the at least one document is accessible to the one or more invitees via the meeting appointment, wherein authorization is granted to each of the one or more invitees to the communication session defining permission levels for each of the one or more invitees to access the at least one document.

16 Claims, 4 Drawing Sheets

(56) References Cited

U.S. PATENT DOCUMENTS

| | | | |
|---|---|---|---|
| 7,930,651 B2* | 4/2011 | May | G06Q 10/109 |
| | | | 715/864 |
| 7,974,871 B2* | 7/2011 | Oral | G06Q 10/06311 |
| | | | 705/7.13 |
| 7,987,233 B1 | 7/2011 | Osborne et al. | |
| 8,060,565 B1* | 11/2011 | Swartz | 709/206 |
| 8,065,282 B2* | 11/2011 | Simison et al. | 707/694 |
| 8,081,958 B2* | 12/2011 | Soderstrom et al. | 455/416 |
| 8,214,748 B2* | 7/2012 | Srikanth | G06Q 10/109 |
| | | | 709/204 |
| 8,250,141 B2 | 8/2012 | Xiao et al. | |
| 8,270,320 B2* | 9/2012 | Boyer et al. | 370/260 |
| 8,553,065 B2* | 10/2013 | Gannu | H04M 3/567 |
| | | | 348/14.07 |
| 8,582,743 B2 | 11/2013 | Teng et al. | |
| 8,583,784 B2* | 11/2013 | Beebe et al. | 709/224 |
| 8,688,489 B2 | 4/2014 | Bhogal et al. | |
| 8,817,668 B2* | 8/2014 | Sekaran | H04L 12/1813 |
| | | | 370/260 |
| 2002/0147625 A1 | 10/2002 | Kolke | |
| 2004/0059785 A1* | 3/2004 | Blume | G06Q 10/109 |
| | | | 709/206 |
| 2004/0141005 A1* | 7/2004 | Banatwala | H04L 12/1813 |
| | | | 715/751 |
| 2005/0018826 A1* | 1/2005 | Benco et al. | 379/202.01 |
| 2005/0018827 A1* | 1/2005 | Himmel et al. | 379/202.01 |
| 2005/0076098 A1 | 4/2005 | Matsubara et al. | |
| 2005/0131714 A1* | 6/2005 | Braunstein | G06Q 30/02 |
| | | | 709/204 |
| 2005/0289202 A1* | 12/2005 | S et al. | 708/112 |
| 2006/0026502 A1* | 2/2006 | Dutta | G06Q 10/10 |
| | | | 715/230 |
| 2006/0067250 A1* | 3/2006 | Boyer et al. | 370/260 |
| 2006/0106872 A1* | 5/2006 | Leban | G06Q 10/109 |
| 2006/0224430 A1* | 10/2006 | Butt | G06Q 10/063116 |
| | | | 705/7.16 |
| 2006/0239212 A1 | 10/2006 | Pirzada et al. | |
| 2006/0250987 A1 | 11/2006 | White | |
| 2008/0005233 A1* | 1/2008 | Cai | H04L 29/06027 |
| | | | 709/204 |
| 2008/0072334 A1* | 3/2008 | Bailey | G06Q 10/10 |
| | | | 726/28 |
| 2008/0126953 A1* | 5/2008 | Davidson | G06Q 10/10 |
| | | | 715/753 |
| 2008/0195585 A1 | 8/2008 | Altberg et al. | |
| 2008/0205616 A1* | 8/2008 | Teng et al. | 379/202.01 |
| 2008/0215961 A1 | 9/2008 | Altberg | |
| 2008/0226051 A1* | 9/2008 | Srinivasan | 379/202.01 |
| 2008/0240392 A1 | 10/2008 | Berstis et al. | |
| 2009/0083639 A1* | 3/2009 | McKee Cooper et al. | 715/753 |
| 2009/0112671 A1* | 4/2009 | Grodum | 705/8 |
| 2009/0112984 A1 | 4/2009 | Anglin et al. | |
| 2009/0181659 A1* | 7/2009 | Stalnacke | G06Q 10/1093 |
| | | | 455/416 |
| 2009/0192845 A1* | 7/2009 | Gudipaty et al. | 705/7 |
| 2009/0222741 A1* | 9/2009 | Shaw | G06Q 10/109 |
| | | | 715/753 |
| 2009/0327019 A1 | 12/2009 | Addae et al. | |
| 2010/0005142 A1* | 1/2010 | Xiao et al. | 709/204 |
| 2010/0076804 A1 | 3/2010 | Jones | |
| 2010/0098230 A1 | 4/2010 | Bhow | |
| 2010/0121666 A1 | 5/2010 | Niazi | |
| 2010/0158220 A1 | 6/2010 | Silverman | |
| 2010/0189238 A1 | 7/2010 | Gupta | |
| 2010/0189244 A1 | 7/2010 | Sastry | |
| 2010/0189260 A1* | 7/2010 | Ramanathan et al. | 380/259 |
| 2010/0217591 A1* | 8/2010 | Shpigel | 704/235 |
| 2010/0235216 A1* | 9/2010 | Hehmeyer et al. | 705/9 |
| 2010/0310062 A1* | 12/2010 | Srinivasan et al. | 379/211.02 |
| 2011/0022967 A1* | 1/2011 | Vijayakumar | G06Q 10/107 |
| | | | 715/753 |
| 2011/0054976 A1 | 3/2011 | Adler et al. | |
| 2011/0135079 A1* | 6/2011 | Shah et al. | 379/202.01 |
| 2011/0173270 A1* | 7/2011 | Uchida | H04N 7/15 |
| | | | 709/206 |
| 2011/0264745 A1* | 10/2011 | Ferlitsch | 709/205 |
| 2011/0270922 A1* | 11/2011 | Jones | G06F 3/0486 |
| | | | 709/204 |
| 2012/0230484 A1 | 9/2012 | Kannappan et al. | |
| 2012/0258726 A1* | 10/2012 | Bansal et al. | 455/456.1 |
| 2012/0278381 A1* | 11/2012 | Ferlitsch et al. | 709/203 |
| 2012/0293605 A1* | 11/2012 | Seferian et al. | 348/14.08 |
| 2012/0304078 A1* | 11/2012 | Ramaswamy et al. | 715/753 |
| 2013/0237240 A1 | 9/2013 | Krantz et al. | |

OTHER PUBLICATIONS

Annie I. Anton "Goal-Based Requirements Analysis" 1996 IEEE, Proceedings of ICRE pp. 137-144.

U.S. Non-Final Office Action in U.S. Appl. No. 13/526,234, dated Jun. 30, 2016, 19 pp.

U.S. Final Office Action received in U.S. Appl. No. 13/526,234, 13 pages, dated Nov. 28, 2016.

"Cisco WebEx for the Android", Cisco [online]. First accessed on May 13, 2011. Retrieved from the Internet: <http://www.webex.com/android/android_faq.html> (4 pgs.).

Henry, "Bridg.me Calls You When the Conference Starts," Apr. 24, 2011, Lifehacker [online]. Retrieved from the Internet: <http://lifehacker.com/5795119/bridgme-calls-you-when-the-conference-starts> (2 pgs.).

"Impossibly Simple Conference Calling,", Bridg.Me [online]. First accessed on May 13, 2011. Retrieved from the Internet: <http://beta.bridg.me/> (1 pg.).

Framer, "Conference Calling Provider," Jun. 17, 2010, Article Trader [online]. Retrieved from the Internet: <http://www.articletrader.com/business/communication/conference-calling-provider.html> (2 pgs.).

"Dial-Out to conference call participants automatically with UBlast," American International Telephonics, LLC [online]. First accessed on May 13, 2011. Retrieved from the Internet: <http://www.aitelephone.com/conference-call-group-dial-out.html> (4 pgs.).

"WebEx Meeting Center," Cisco [online]. First accessed on May 13, 2011. Retrieved from the Internet: <http://try.webex.com/meet/shop/webex_express_06.html> (4 pgs.).

Tsotsis, "With Bridg.me The Conference Calls You," Apr. 21, 2011, TechCrunch [online]. Retrieved from the Internet: <http://techcrunch.com/2011/04/21/with-bridg-me-the-conference-calls-you/> (1 pg.).

Horowitz, "Idea of the Day: A Conference Line That Calls All of the Participants So They Don't Have To Dial In," Apr. 22, 2011, Business Insider [online]. Retrieved from the Internet: <http://www.businessinsider.com/idea-of-the-day-schedule-a-conference-call-on-google-calanders-and-bridgme-will-call-all-participants-at-the-correct-time-2011-4> (2 pgs.).

An intelligent fuzzy meeting agent for decision support system Chang-Shing Lee ; Chen-Yu Pan Fuzzy Systems, 2003. FUZZ '03. The 12th IEEE International Conference.

Non-Final-Office Action dated Feb. 24, 2014 in U.S. Appl. No. 13/526,234.

Non-Final-Office Action dated Dec. 22, 2014 in U.S. Appl. No. 13/526,234.

Notice of Allowance dated Aug. 18, 2014 in U.S. Appl. No. 13/526,234.

Non-Final-Office Action dated Jan. 6, 2014 in U.S. Appl. No. 13/526,355.

Final-Office Action dated Mar. 18, 2014 in U.S. Appl. No. 13/526,355.

Non-Final-Office Action dated Aug. 19, 2014 in U.S. Appl. No. 13/526,355.

Final-Office Action dated Mar. 11, 2015 in U.S. Appl. No. 13/526,355.

* cited by examiner

INTEGRATED CALENDAR AND CONFERENCE APPLICATION FOR DOCUMENT MANAGEMENT

CLAIM OF PRIORITY

This application claims the benefit of priority to U.S. Provisional Application No. 61/497,902, filed Jun. 16, 2011, which is assigned to the assignee hereof and is hereby expressly incorporated by reference herein.

TECHNICAL FIELD

This disclosure relates to virtual conferencing with document management.

BACKGROUND

Two or more users of computing devices may engage in a real-time communication session, such as a video conference, where the computing devices exchange live video and audio transmissions.

SUMMARY

In one example, a method is provided that comprises retrieving, at a computing device, a meeting appointment in a calendar application executed by the computing device for a meeting via a communication session, wherein the meeting appointment includes identifying information of one or more invitees to the meeting and identifying information for the communication session, wherein the communication session enables communication between different computing devices. The method further comprises identifying at least one document associated with the communication session. The method also comprises linking the at least one document with the meeting appointment such that a centralized version of the at least one document is accessible to the one or more invitees via the meeting appointment, wherein authorization is granted to each of the one or more invitees to the communication session defining permission levels for each of the one or more invitees to access the at least one document.

In another example, a computer-readable storage medium is provided that comprises instructions for causing a programmable processor to perform operations. The instructions may include retrieving, at a computing device, a meeting appointment in a calendar application executed by the computing device for a meeting via a communication session, wherein the meeting appointment includes identifying information of one or more invitees to the meeting and identifying information for the communication session, wherein the communication session enables communication between different computing devices. The instructions may also include identifying at least one document associated with the communication session. The instructions may also include linking the at least one document with the meeting appointment such that a centralized version of the at least one document is accessible to the one or more invitees via the meeting appointment, wherein an authorization is granted to each of the one or more invitees to the communication session defining permission levels for each of the one or more invitees to access the at least one document.

In yet another example, a computing device is provided. The computing device may further comprise a network interface to connect to a communication session, wherein the communication session enables communication between the computing device and one or more other computing devices. The computing device may also comprise one or more processors configured to retrieve a meeting appointment in a calendar application of the computing device, wherein the meeting appointment is for a meeting via the communication session, determine at least one document associated with the communication session, and link the at least one document with the meeting appointment such that a centralized version of the at least one document is accessible via the meeting appointment, wherein a permission is granted to an invitee to the meeting defining a permission level for the invitee to access the at least one document The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present application. Like reference characters denote like elements throughout the figures and text.

DETAILED DESCRIPTION

Techniques of some embodiments of the present disclosure are directed at functionality for integrating a calendar application with a communications application that may be used for conference calls, videoconferences, or any appropriate group communications. Techniques of some embodiments of the present disclosure are also directed to integrating documents with the calendar application. Some computing devices such as mobile devices, smart phones, personal data assistants (PDAs), or tablet computers are often used in situations where it may be difficult to place a phone call to connect to a conference.

A user may communicate with others, such as conference with colleagues or socialize with friends by chatting, watching television or videos, playing games, or engaging in other activities. In some instances, a user and other participants in a conference call may not be in the same physical location. Instead, the user and her or his friends or colleagues may rely on other mechanisms to socialize and conference, such as talking on the phone, sending email, and/or text messaging.

A communication session as used herein is a broad term encompassing as its plain and ordinary meaning, including but not limited to, one or more objects, which may be stored in and/or are executable by software/firmware, which may enable communication clients coupled to the one or more objects to exchange information. The one or more objects may include data and/or provide functionality of a communication session as described herein. As used herein, a conference call and a communication session are used interchangeably and include a multi-party conference. A communication session may also be a virtual video group meeting.

A virtual communication session may be a virtual space where multiple users can engage in a conversation and/or share information. When a user is available for a conversation (for example, the user is hanging out), the user may select an option in an application (for example, a social media application) that indicates the user is available. An invitation or notification may be sent to people associated with the user (for example, the user's friends) indicating that the user is available to chat. The invitation may be provided in a social media feed. When a second user decides to converse with the first user, a virtual communication session is initiated between the users. Techniques of this disclosure may be applied to communication sessions that are virtual communication sessions.

Figure 1:
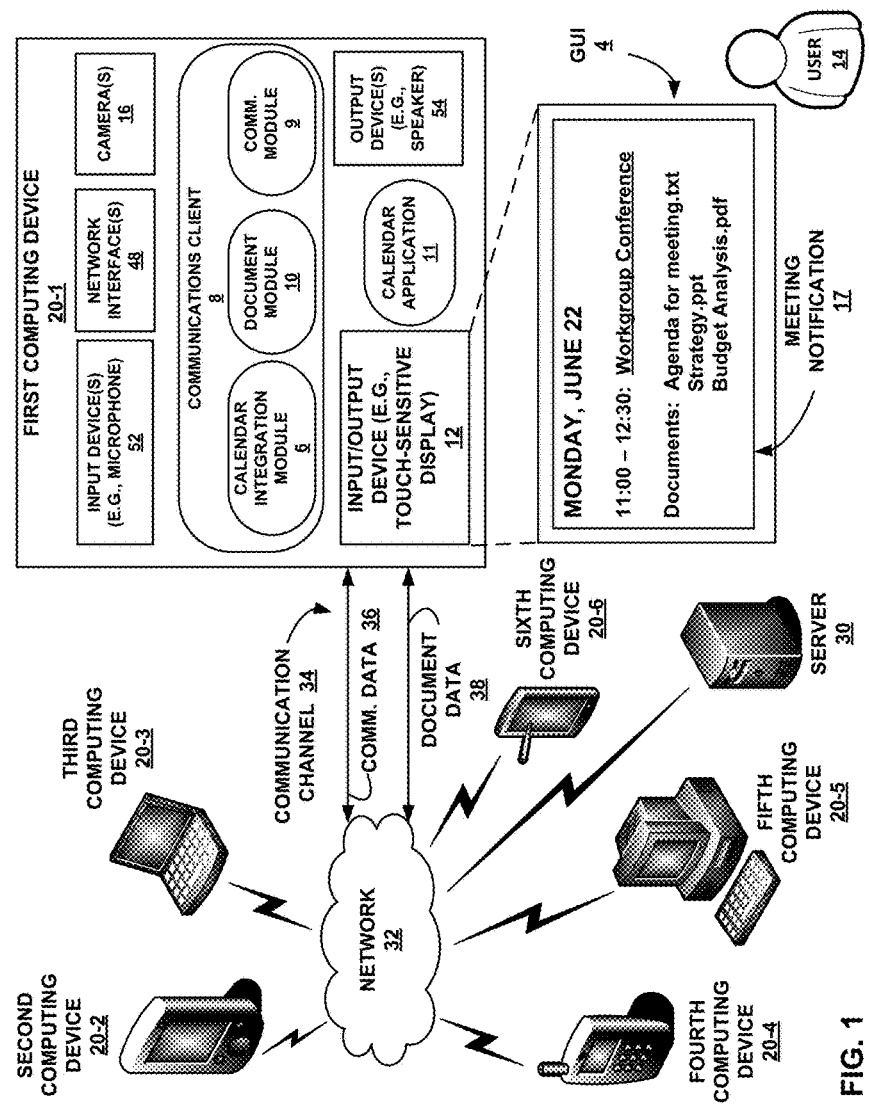
FIG. 1 is a block diagram illustrating an example of a computing device that may execute one or more applications and engage in a communication session with one or more other computing devices, in accordance with one or more aspects of the present disclosure.

FIG. 1 is a block diagram illustrating an example of a first computing device 20-1 that may execute one or more applications (for example, communication client 8 and calendar application 11) and engage in a conference or communication session with one or more other computing devices 20-2 through 20-6, in accordance with one or more aspects of the present disclosure. As described herein, first computing device 20-1 may simply be referred to as computing device 20-1. Computing device 2 may integrate calendar application 11 with a calendar integration module 6 of communications client 8 to ensure documents used during communication sessions (such as reoccurring conference calls) are not lost, updatable, and organized.

Computing device 20-1 may engage in a voice or video conference with a plurality of other computing devices, such as computing devices 20-2 through 20-6. That is, user 14 may use computing device 20-1 to engage with other participants using other computing devices 20-2 through 20-6 in a communication session. Computing device 20-1 may connect to one or more other computing devices 20-2 through 20-6 through network 32. As illustrated in FIG. 1, other computing devices may include second computing device 20-2, third computing device 20-3, fourth computing device 20-4, fifth computing device 20-5, and sixth computing device 20-6. Thus, as shown in FIG. 1, six computing devices 20-1 through 20-6 (referred to herein collectively as "computing devices 20") are shown as being engaged in a communication session. In further examples, different numbers of computing devices 20 may be implemented. For illustrative purposes, FIG. 1 is discussed in terms of a currently ongoing communication session between computing device 20-1 and computing devices 20-2 through 20-6.

Computing device 20-1 may, in some examples, include or be part of a portable computing device (for example, a mobile phone, netbook, laptop, personal data assistant (PDA), tablet device, portable gaming device, portable media player, e-book reader, or a watch) as well as non-portable devices (for example, a desktop computer). For purposes of illustration only, in this disclosure, computing device 20-1 is described as a portable or mobile device, but aspects of this disclosure should not be considered limited to such devices. Similarly, computing devices 20 may include or be part of a portable computing device as well as non-portable devices. As illustrated, second computing device 20-2 may be a PDA, third computing device 20-3 may be a laptop, fourth computing device 20-4 may be a mobile phone, fifth computing device 20-5 may be a desktop computer, and sixth computing device 20-6 may be a tablet device. Any other numbers and combinations of types of computing devices participating in a video conference according to techniques of this disclosure are contemplated.

Computing device 20-1 may include an input/output device 12 (for example, a touch-sensitive device), one or more input devices 52 (for example, a microphone), one or more cameras 16, and one or more output devices 54 (for example, a speaker). In some examples, input/output device 12 may comprise a display device that outputs a graphical user interface (GUI) 4. In some examples, input/output device 12 may only be an output device. For example, input/output device 12 may be a screen without input capabilities. In other examples, input/output device 12 may be a presence-sensitive screen or a touch screen. In some examples, input/output device 12 may be capable of receiving touch input from user 14 (for example, GUI 4 may comprise a touch screen, track pad, track point, or the like). User 14 may interact with input/output device 12, for example, by performing touch input on GUI 4. One example of computing device 20-1 is more fully described in FIG. 2, discussed below.

Computing device 20-1 may connect to network 32, including a wired or wireless network, via one or more network interfaces 48. Computing device 20-1 may connect to computing devices 20-2 through 20-6, or to any other number of computing devices. Computing devices 20-2 through 20-6 may be connected to network 32 via wired and/or wireless links. Network 32 may include a wide-area network such as the Internet, a local-area network (LAN), an enterprise network, a wireless network, a cellular network, a telephony network, a Metropolitan area network (for example, Wi-Fi, WAN, or WiMAX), one or more other types of networks, or a combination of two or more different types of networks (for example, a combination of a cellular network and the Internet).

In another example, computing device 20-1 may connect to server 30 through one or more network interfaces 48. Computing device 20-1 and computing devices 20-2 through 20-6 may send data to or receive data from server 30 via network 32. Server 30 may be any of several different types of network devices. For instance, server 30 may be a conventional web server, a specialized media server, a personal computer operating in a peer-to-peer fashion, or another type of network device. In other examples, server 30 may provide conference calling capabilities in accordance with one aspect of this disclosure. For example, server 30 may manage a six-way communication session between computing devices 20. In another example, server 30 may provide at least one of calendar or document management capabilities.

Computing device 20-1 may connect or be connected to any of the computing devices 20-2 through 20-6 in a peer-to-peer fashion, either directly or through network 32. A peer-to-peer connection may be a network connection that partitions tasks or workloads between peers (for example, first computing device 20-1 and second computing device 20-2) without centralized coordination by a server (for example, server 30). Computing device 20-1 and second computing device 20-2 may exchange communication data over communication channel 34 via a peer-to-peer connection. In other examples, any combination of computing device 20-1 and computing devices 20-2 through 20-6 may communicate in a peer-to-peer fashion.

Although the systems and techniques described herein support conferencing capabilities, for illustrative purposes only, FIG. 1 will be described in terms of a real-time video communication between first computing device 20-1 and second through sixth computing devices 20-2 through 20-6. However, it is to be understood that the techniques and examples described in accordance with this disclosure apply to other types of communication sessions having any number of two or more participants. Also, for illustrative purposes only, this disclosure refers to participants in the sense that there is a single participant (for example, a person or user) for each computing device 20. However, it is to be understood that there may be more than one participant for each of computing devices 20. In other examples, any of computing devices 20 may be engaged in a video conference without a user.

This disclosure also describes, for illustrative purposes only, each of computing devices 20 as transmitting a single audio or video feed. However, it is to be understood that there may be more than one audio or video feed from each of computing devices 20. For example, more than one user may be using a single computing device, such as, for example, computing device 20-4, to participate in a video conference. In such an example, computing device 20-4 may include more than one input devices 52 (for example, two microphones and two cameras). In such an example, the techniques described in this disclosure may be applied to the additional audio or video feeds as if they were from separate computing devices.

In FIG. 1, computing devices 20-1 through 20-6 have established a real-time video communication, referred to herein as a video conference. A user 14 operates first computing device 20-1 as a participant in the video conference, and may be interchangeably referred to herein as a participant or as user 14. Similarly, as described herein for illustrative purposes only, five additional participants operate one of computing devices 20-2 through 20-6. As described above, in other examples, different numbers of participants and different numbers of computing devices 20 may be engaged in the real-time video conference.

In one example, computing devices 20 exchange communication data over communication channel 34, which may be streamed real-time. In some examples, communication data may include communication data 36, which may include video, image, and audio data. Image data may be any data that can be visually represented on GUI 4. Communication data 36 may include one or more still images, a video, a document, a visual presentation, or the like. In one example, communication data 36 may be one or more real-time video feeds. As described herein, communication data 36 may comprise a plurality of image data signals. In some examples, the image data signals may be associated with a participant or user. In some examples, each computing device 20-2 through 20-6 communicatively coupled to computing device 20-1 may provide an image data signal as part of communication data 36.

Communication channel 34 may also transfer document data 38 between first computing device 20-1 and at least one of the one or more computing devices 20-2 through 20-6 or server 30. Document data 38 may comprise data relating to one or more documents that may be associated with the communication session. The documents may be shared between participants using computing devices 20 of the communication session. In some examples, some users may have authorization to edit the one or more documents. In additional examples, document data 38 may include information or data associated with a calendar application. A calendar application may be used to at least manage or organize documents.

Communication channel 34 may also transfer document data 38 between first computing device 20-1 and at least one of the one or more computing devices 20-2 through 20-6 or server 30. Document data 38 may comprise data relating to one or more documents that may be associated with the communication session. The documents may be shared between participants using computing devices 20 of the communication session. In some examples, some users may have authorization to edit the one or more documents.

In some examples, communication data 36 and document data 38 may be transferred between computing devices 20 over different channels. In other examples, document data 38 and communication data 36 may be transferred over a single channel. In one example, communication channel 34 may use a Real-time Transport Protocol ("RTP") standard developed by the Internet Engineering Task Force ("IETF"). In examples using RTP, communication data 36 may have a format such as H.263 or H.264. In other examples, other protocols or formats are used. In other examples, some or all of the communication data may be transferred encrypted, such as, for example, using Secure Real-time Transport Protocol (SRTP), or any other encrypted transfer protocol.

In one example, first computing device 20-1 may generate a portion of communication data 36 from camera 16 and from input device 52 (for example, a microphone). In one example, first computing device 20-1 may receive video data from camera 16. In one example, output from camera 16 is provided to one or more of computing devices 20-2 through 20-6 so image data associated with user 14 may be displayed on one or more of computing devices 20-2 through 20-6. Image data associated with user 14 may include any image data user 14 wishes to display during the communication session. For example, camera 16 may be pointed approximately at user 14 in order that other participants in the video conference may see an image of user 14. In other examples, user 14 may direct camera 16 elsewhere, for example, at a scene or a document.

In one example, communication data 36 may comprise image data and audio data that may be associated with each other (for example, the audio data is diegetic to the image data). In other examples, the image data and the audio data may not be associated with each other (for example, the audio data is non-diegetic with the image data, for example, a sound track is played along with image data). In some examples, communication data 36 may include both audio data and image data; however, in other examples, communication data 36 may include only one of either audio data or image data. Further, at any given moment during the real-time video communication, any of computing devices 20-1 through 20-6 may be sending only communication data 36, only document data 38, or both.

Computing device 20-1 includes a communications client 8 that, when executed, provides functionality to computing device 20-1 to establish and maintain communications between one or more computing devices 20-2 through 20-6. Communication client 8 may further include a communication module 9. Communication module 9 may provide functionality for computing device 20-1 to engage in a communication session with one or more other users using different computing devices. Communication module 9 may further include functionality that enables communication client 8 to connect to a communication server and join one or more communication sessions. Communication module 9 may also provide functionality for computing device 20-1 to indicate to one or more other users the availability of user 14 to engage in a communication session. In some examples, one or more friends included in a relationship group of user 14 are notified of the status of user 14 by communication module 9. A relationship group may be a way to organize contacts and may include one or more other users that may be among a group of people having one or more defined relationships with user 14 (for example, friends of user 14 in a social media application, colleagues, family, etc.). Communications client 8 may also provide signals to GUI 4 to display information related to the communication session and to enable user 14 to interact with communications client 8.

Computing device 2 may include a calendar application 11. Calendar application 11 may provide functionality to schedule meetings for communication sessions. Calendar application 11 may issue meeting notifications at or before a scheduled date and time for a communication session. The meeting notifications may also be reoccurring for reoccurring communication sessions. A reoccurring communication session may be a communication session that has two or more instances. For example, a meeting that takes place almost every Tuesday may be a reoccurring communication session.

Communications client 8 may include a calendar integration module 6 and a document module 10. Calendar integration module 6, in various instances, provides computing device 2 with capabilities to integrate aspects of a communication session into one or more appointments scheduled into a calendar application of computing device 2. An appointment may be a reminder for a communication session or other event on stored in calendar application 11 at a scheduled time, which may be a particular date and time. An appointment for a communication session may include additional information, such as a list of invitees to the communication session, a list of one or more documents associated with the communication session, a name of the communication session, a next occurrence of the communication session, or the like. In some examples, a location for the communication session may be provided in the appointment for those invitees who can be physically present at the location rather than virtually joining the communication session with a computing device.

Calendar integration module 6 may integrate calendar application 11 with communication module 9. For example, communications module 9 may be used to connect to, initiate, or host communication sessions that may be scheduled using calendar integration module 6. Communications module 9 may determine whether a communication module is scheduled by querying or otherwise interacting with calendar integration module 6. Calendar integration module 6 may determine whether a communication session is scheduled from calendar application 11. In other examples, communications client 8 contains further communication modules having additional capabilities.

Additionally, document module 10 may manage one or more documents associated with communication sessions. Document module 10 may work with calendar integration module 6 to manage one or more documents associated with a communication session. In some examples, the one or more documents may be stored centrally in calendar application 11. A host of the communication session, such as server 30, may control a master calendar, such as a version of calendar application 11, which stores the one or more documents. In other examples, each individual computing device 20 may locally store a copy of the one or more documents. An appointment in calendar application 11 or a meeting notification to remind a user about an appointment may contain one or more links to the one or more documents. In some examples, the links may be uniform resource identifier (URI) links, such as a uniform resource locator. Other examples may use other ways or techniques for managing one or more documents.

One or more of the computing devices 20-2 through 20-6 may send at least one of document data 38 and communication data 36 from similar input devices to computing device 20-1. During a video conference, computing device 20-1 may output some or all of this received document data 38 and communication data 36, for example, with output devices 54 (for example, a speaker) and GUI 4. Document data 38 may include one or more changes made to one or more documents associated with a communication session. A change made to a document may be any alteration to the document, including changes to content, metadata, properties, or the like. In some examples, document data 38 may further include identifying information that identifies or labels at least one of one or more changes made to one or more documents, which user or computing device 20 made the changes, and when the changes were made. In some examples, each computing device 20 may provide document data 38 to a central communication session host, such as server 30.

In some examples, image data associated with communication data 36 may not be streamed while document data 38 is streamed. In further examples, audio data may not be streamed while image data is streamed. In another example, multiple audio data signals may be streamed by computing device 20-1.

GUI 4 of computing device 2 may display all or part of document data 38 and communication data 36. Communications client 8 may define a number of image data signals that may be displayed on GUI 4 at any given moment during a communication session. Communications client 8 may also display meeting notifications from calendar application 11. For example, as shown in FIG. 1, GUI 4 may be configured to display a meeting notification 17 associated with a communication session. Meeting notification 17 may be a calendar reminder saved in or generated by calendar application 11. Meeting notification 17 may provide links to resources associated with the communication session, such as one or more documents. As shown in FIG. 1, these resources are three documents, including a text-based document (agenda for meeting.txt), a presentation (strategy.ppt), and a budget (budget analysis.pdf). In other examples, other numbers and types of documents may be integrated with meeting notification 17.

Figure 2:
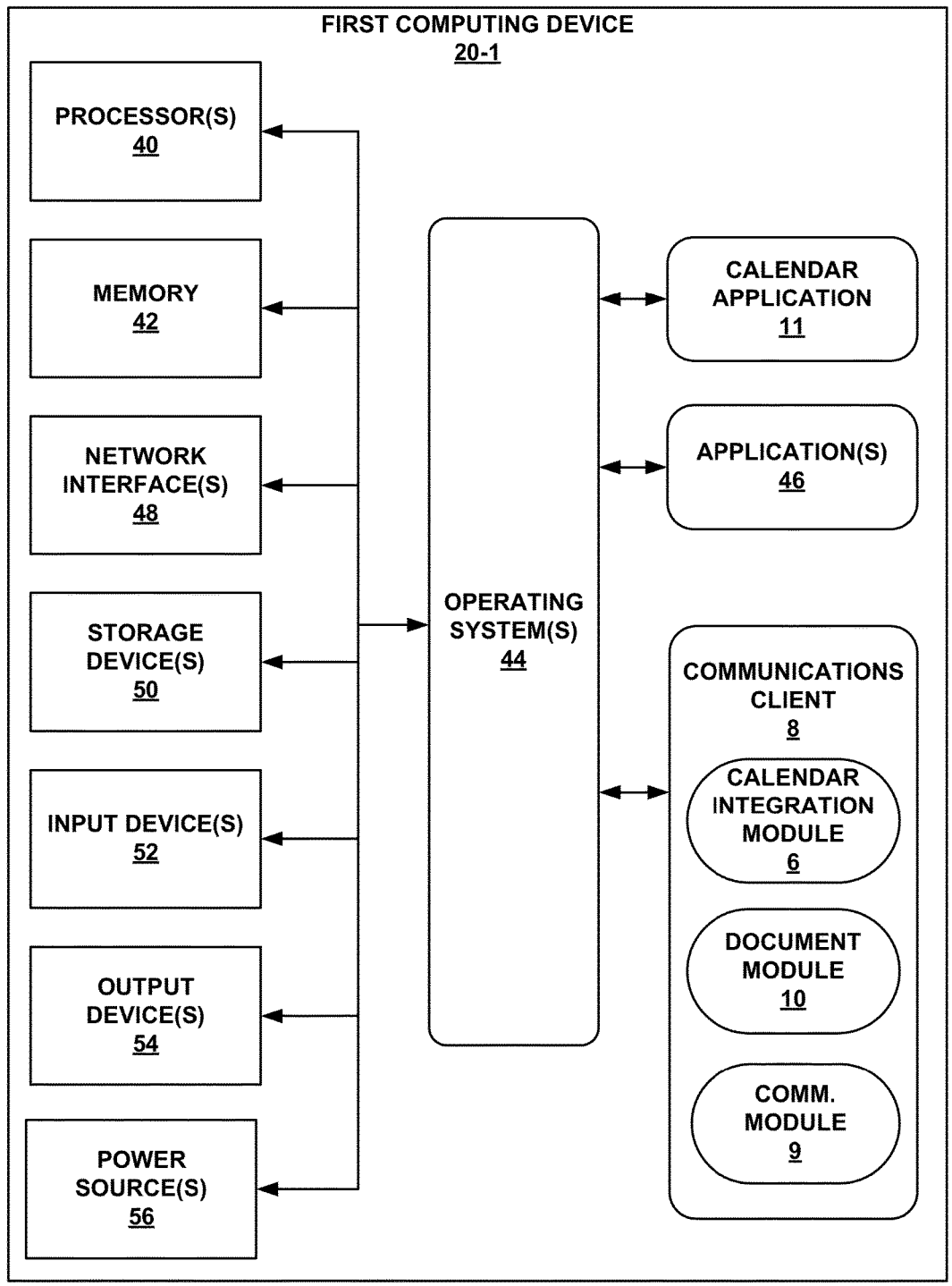
FIG. 2 is a block diagram illustrating further details of one example of computing device shown in FIG. 1, in accordance with one or more aspects of the present disclosure.

FIG. 2 is a block diagram illustrating further details of one example of computing device 20-1 shown in FIG. 1. FIG. 2 illustrates only one particular example of computing device 20-1, and many other example embodiments of computing device 20-1 may be used in other instances. Additionally, one or more computing devices 20-2 through 20-6 may be similar to computing device 20-1 as shown in FIG. 2.

As shown in the specific example of FIG. 2, computing device 20-1 includes one or more processors 40, memory 42, one or more network interfaces 48, one or more storage devices 50, one or more input devices 52, one or more output devices 54, and one or more power sources 56. Computing device 20-1 also includes one or more operating systems 44. Computing device 20-1 may include one or more applications 46, calendar application 11, and communications client 8. Communications client 8 may include selection module 6 executable by computing device 20-1. One or more operating systems 44 may include communications client 8, calendar integration module 6, or document module 10 executable by computing device 20-1. Operating system 44, applications 46, and communications client 8 are also executable by computing device 20-1. Each of components 40, 42, 44, 46, 48, 50, 52, 54, 56, 6, 8, 10, and 11 may be interconnected (physically, communicatively, and/or operatively) for inter-component communications.

Processors 40 may be configured to implement functionality and/or process instructions for execution in computing device 2. Processors 40 may be capable of processing instructions stored in memory 42 or instructions stored on storage devices 50.

Memory 42 may be configured to store information within computing device 20-1 during operation. Memory 42 may, in some examples, be described as tangible or a non-transitory computer-readable storage medium. In some examples, memory 42 is a temporary memory, meaning that memory 42 may be used for short-term storage. Memory 42 may also, in some examples, be described as a volatile memory, meaning that memory 42 does not maintain stored contents when computing device 20-1 is turned off. Examples of volatile memories include random access memories (RAM), dynamic random access memories (DRAM), static random access memories (SRAM), and other forms of volatile memories known in the art. In some examples, memory 42 may be used to store program instructions for execution by processors 40. Memory 42 may be used by software or applications running on computing device 20-1 (for example, one or more of applications 46) to temporarily store information during program execution.

Storage devices 50 may also include one or more tangible or non-transitory computer-readable storage media. Storage devices 50 may be configured to store larger amounts of information than memory 42. Storage devices 50 may further be configured for long-term storage of information. In some examples, storage devices 50 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 20-1 may also include one or more network interfaces 48. Computing device 20-1 may utilize one or more network interfaces 48 to communicate with external devices via one or more networks (for example, network 32 shown in FIG. 1). In one example, one or more network interfaces 48 may correspond to an interface for receiving data from computing devices (for example, computing devices 20-2 through 20-6 of FIG. 1). In some examples, computing device 20-1 may include a plurality of either or both input and output interfaces. In some examples, network interfaces 48 may include separate input and output network interfaces of network interfaces 48. In other examples, input and output interfaces may be may be functionally integrated.

One or more network interfaces 48 may include one or more of a network interface card, such as an Ethernet card, configured to communication over, for example, Ethernet, transmission control protocol (TCP), Internet protocol (IP), asynchronous transfer mode (ATM), or other network communication protocols. In other examples, one of network interfaces 48 may be an optical transceiver, a radio frequency transceiver, or any other type of device that can send and receive information. Examples of such network interfaces may include Bluetooth®, 3G and WiFi® radios in mobile computing devices as well as USB. Examples of such wireless networks may include WiFi®, Bluetooth®, and 3G. In some examples, computing device 20-1 may utilize network interface 48 to wirelessly communicate with an external device, such as server 30 or computing devices 20-2 through 20-6, a mobile phone, or other networked computing device.

Computing device 20-1 may also include one or more input devices 52. Input devices 52 may be configured to receive input, for example, from user 14, through tactile, audio, or video feedback. Examples of input devices 52 may include a touch-sensitive display, a mouse, a keyboard, a voice responsive system, a microphone, video camera 16, or any other type of device for detecting a command from user 14. In one example, one or more input devices 52 may comprise input/output device 12 as shown in FIG. 1. In another example, one or more input devices 52 may comprise a display device that provides GUI 4 as shown in FIG. 1.

One or more output devices 54 may also be included in computing device 20-1, for example, GUI 4. Output devices 54 may be configured to provide output to user 14 using tactile, audio, or video output. Output devices 54 may include a touch-sensitive display, and may utilize a sound card, a video graphics adapter card, or any other type of device for converting a signal into an appropriate form understandable to humans or machines. Additional examples of output devices 54 may include a speaker, a cathode ray tube (CRT) monitor, a liquid crystal display (LCD), or any other type of device that can provide output to user 14. In one example, one or more output devices 54 may comprise input/output device 12 as shown in FIG. 1. In another example, one or more output devices 54 may comprise GUI 4 as shown in FIG. 1.

Computing device 20-1 may include one or power sources 56, which may provide power to computing device 20-1. One or more power sources 56 may be internal to client device 10, such as a battery, or may be an external power source. In other examples, computing device 6-1 may be connected to an electrical grid through power source(s) 52, for example, via a power outlet or telephone line. The one or more power sources 56 may be one or more batteries, which may be rechargeable. The one or more batteries may be made from nickel-cadmium, lithium-ion, or any other suitable material.

Computing device 20-1 may include one or more operating systems 44. One or more operating system 44 may control the operation of components of computing device 20-1. For example, operating systems 44 may facilitate the interaction of application 46 or communications client 8 with processors 40, memory 42, network interfaces 48, storage devices 50, input devices 52, output devices 54, and batteries 56.

Communications client 8 may additionally include calendar integration module 6 and document module 10, which may be executed as part of operating system 44. In other cases, calendar integration module 6 or document module 10 may be implemented or executed by computing device 20-1. Calendar integration module 6 may process conference resources such as documents (through document data 38, for example), access control to the documents, and manage meeting reminders for a communication session.

Communications client 8 may provide signals to instruct GUI 4 to display images and user selectable options or fields associated with the communication session, documents, or a meeting notification. Additionally, calendar integration module 6 or document module 10 may receive input from a component such as processors 40, memory 42, one or more network interfaces 48, one or more storage devices 50, one or more output devices 54, one or more power sources 56, or operating system 44. In some cases, calendar integration module 6 or document module 10 may perform additional processing on communication data 36 and document data 38. In other cases, calendar integration module 6 or document module 10 may transmit input to an application, for example calendar application 11, or other component in computing device 20-1.

Any applications, e.g. calendar application 11 or applications 46, implemented within or executed by computing device 2 may be implemented or contained within, operable by, executed by, and/or be operatively/communicatively coupled to components of computing device 2, e.g., one or more processors 40, memory 42, one or more network interfaces 48, and/or storage devices 50.

Figure 3:
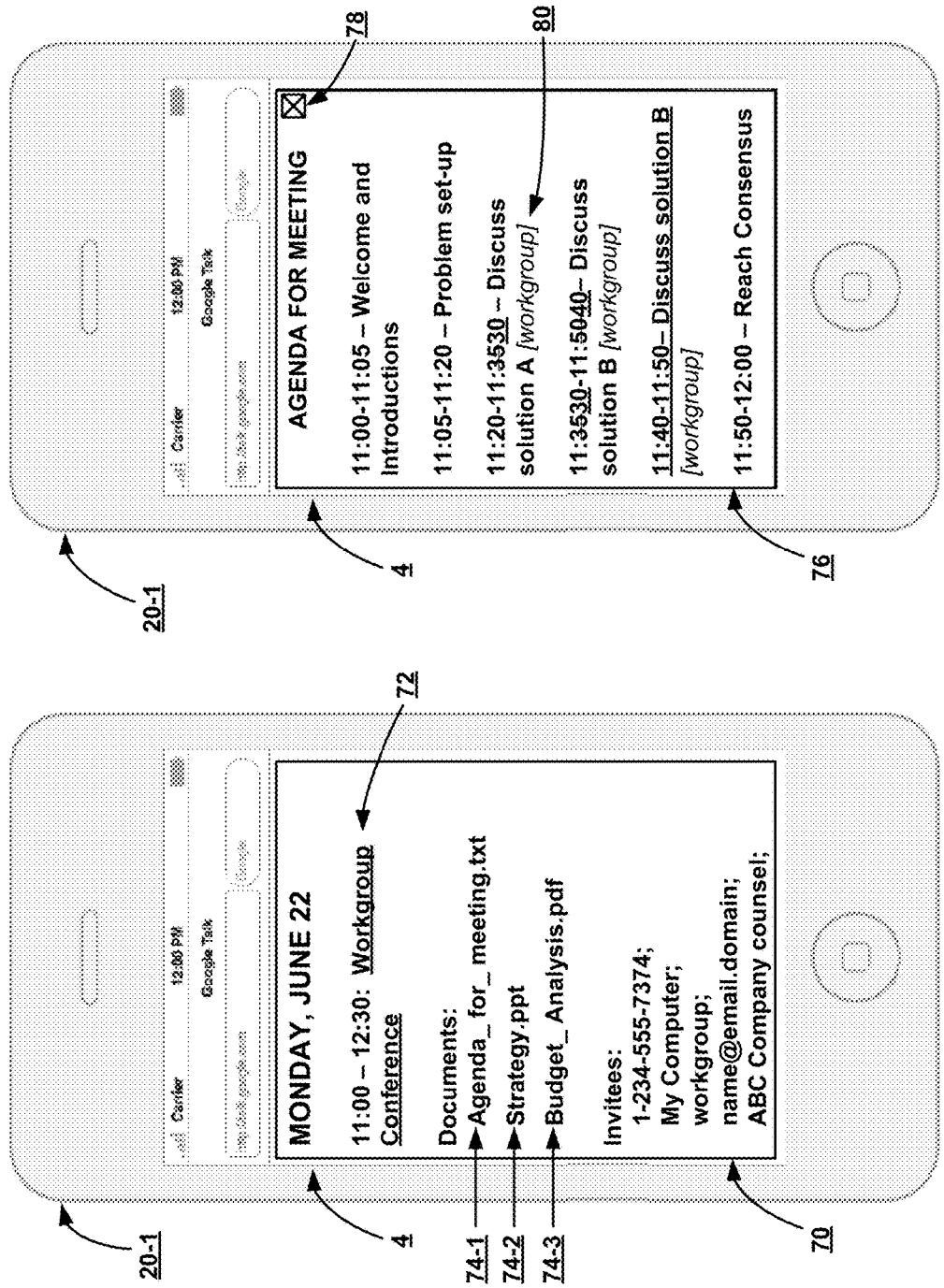
FIGS. 3A and 3B are screen diagrams illustrating examples of calendar document integration on a computing device, in accordance with one or more aspects of the present disclosure.

FIGS. 3A and 3B are screen diagrams illustrating examples of calendar document integration on a computing device, in accordance with one or more aspects of the present disclosure. The computing device providing the GUIs in FIGS. 3A and 3B may be computing device 20-1 as shown in FIGS. 1 and 2. A user, such as user 14, may operate computing device 20-1. For illustrative purposes only, computing device 20-1 is shown as a mobile phone in FIGS. 3A and 3B.

Computing device 20-1 may include a calendar application 11, one or more applications 46, a communication client 8, one or more input devices 52, and one or more output devices 54. In some examples, one or more of the input devices 52 and one or more of the output devices 54 may be integrated into a single input/output device, such as a presence-sense screen or a touch screen. Computing device 20-1 may communicate with a server device via a communication channel, such as server device 30 and communication channel 34 as shown in FIG. 1.

An appointment may be scheduled at a specific day and time in a calendar generated by a calendar application, such as calendar application 11. FIG. 3A shows an appointment 70 that may have been scheduled by calendar application 11. In some examples, appointment 70 may be a meeting notification. Appointment 70 may pop-up on GUI 4 of computing device 20-1 at a specified time or may be displayed through action of a user, such as selected an appointment in calendar application 11.

An appointment for a communication session in a calendar may include one or more links to documents associated with the communication session. A document may be associated with a communication session in many different ways, including, for example, being linked to an appointment by an organizer or moderator of the communication session, being emailed by an invitee to the communication session or emailed between invitees, uploaded by an invitee to a common application or website, or through other ways. Linking a document with an appointment may be achieved by attaching the document to the appointment with a feature in calendar application 11 that allows attachments, dragging and dropping an icon of the document into an interface for the appointment, or the like.

GUI 4 in FIG. 3A shows links three documents with appointment 70. The three links to the documents are shown as Agenda_for_meeting.txt link 74-1, Strategy.ppt link 74-2, and Budget_Analysis.pdf link 74-3, commonly referred to as links 74. A link 74 to a document in appointment 70 (or in a meeting notification, in other examples) may be user-interactive touch-target. Links 74 may be a network-based link, such as a URL, that is used to interact with a document. A user, such as user 14, may click, touch, or otherwise select one of links 74 to open or otherwise interact with the associated document. Links 74 may be easily accessible from a calendar application 11, appointment 70, or other notification. In other examples, one or more buttons of computing device 20-1 are associated with one or more documents, such that a document is pulled up when a button is activated. In some examples, a link may be provided that may be used to join a scheduled communication session. Such a link may be appended to one or more fields in calendar application 11.

Selecting one of links 74 may launch an application to open the document associated with the link 74. In some examples, each document has a separate link 74, as shown in FIG. 3A. In other examples, appointment 70 may have a single link that opens up another application, such as a browser, that may be used to navigate to the documents. In some examples, a user interface may be provided to connect to the documents. Information related to the documents, included information about changes made to the documents, what appointments the documents are relevant for, and the like may be outputted along with links to the documents.

In one example, if user 14 is not already signed in to a user interface or calendar, a separate user interface may be launched that allows user 14 to sign in. A name 72 of the communication session may be displayed in appointment 70. As shown in FIG. 3A, "Workgroup Conference" is the name 72 of the communication session. In some examples, name 72 of the communication session and used to log in to access the documents.

FIG. 3B shows one example of GUI 4 of computing device 20-1 displaying a document 76, in accordance with one or more aspects of the present disclosure. Document 76 may be the document Agenda_for_Meeting.txt, referenced in FIG. 3A. Document 76 may have been accessed by a user selecting document link 74-1 as shown in FIG. 3A. In some examples, an exit button 78 is provided that closes document 76 when activated. Exit button 78 may be a user selectable option (such as a touch-target) that is displayed by GUI 4.

Document 76 is shown as a text file that provides information about an agenda for the scheduled communication session. In some examples, document 76 may track changes made to the content of document 76. Changes may be tracked from any time, such as for example, after document 76 was generated, after document 76 was associated with a communication session, after a particular meeting in a reoccurring communication session, or the like. For example, document 76 includes the text "11:20-11:30— Discuss Solution A [workgroup]," where the text [workgroup] is a label 80. In this example, text that has strikethrough has been deleted and text that is underlined has been added. Label 80 identifies which user or invitee to the communication session made which changes to document 76. In the examples of FIGS. 3A and 3B, the invitee named "workgroup" made the changes shown in document 76. In other examples, more than one user may have made one or more changes to document 76. In such an example, each user who made a change to document 76 may be identified, the most recent user to make a change to document 76 may be identified, or any other number or combination of the users may be identified.

Figure 4:
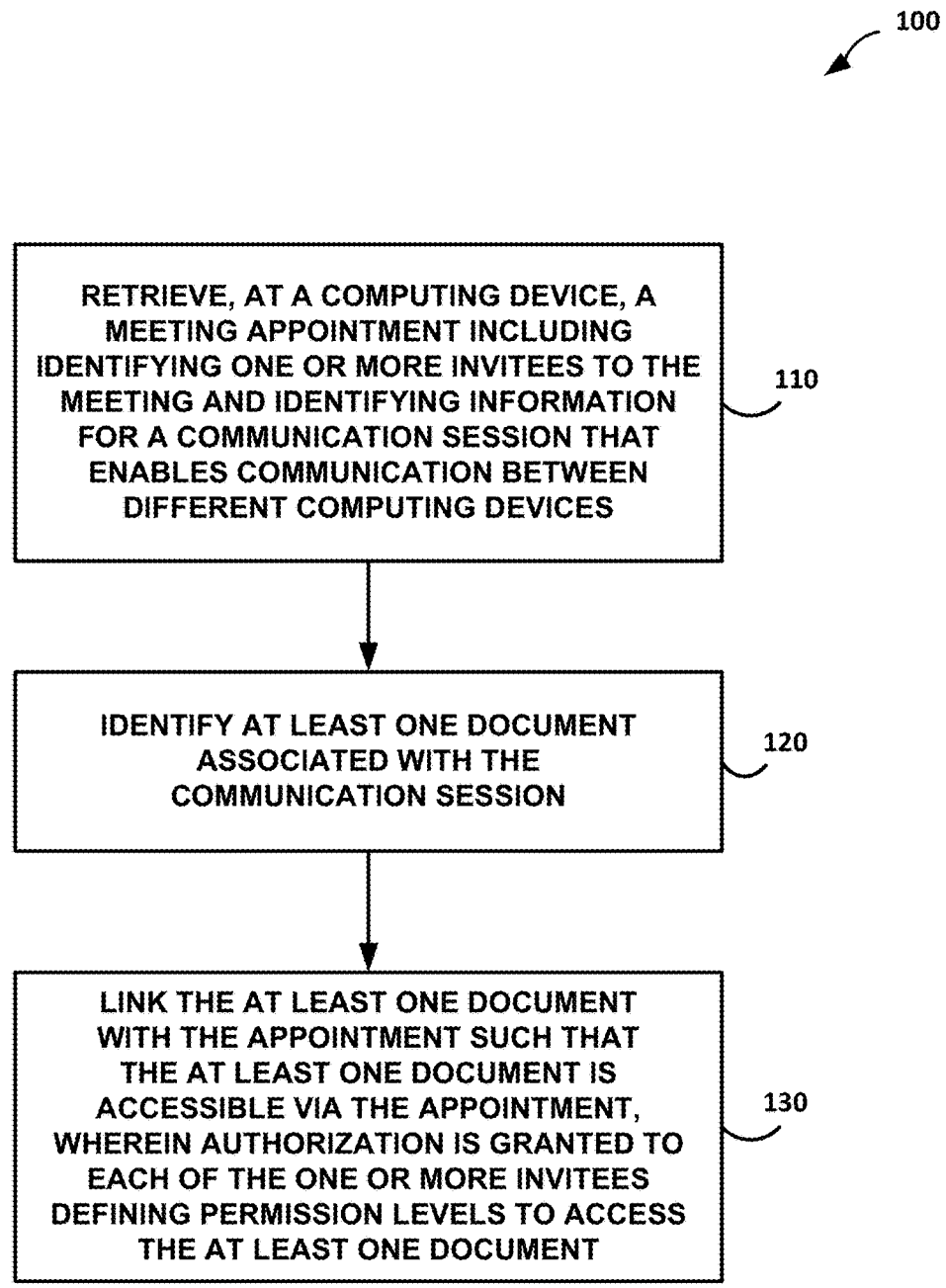
FIG. 4 is a flow chart illustrating an example method of integrating one or more documents for communication session with a calendar application, in accordance with one or more aspects of the present disclosure.

FIG. 4 is a flow chart illustrating an example method 100 of integrating one or more documents for communication session with a calendar application, in accordance with one or more aspects of the present disclosure. The method of FIG. 4 may be described with respect to computing device 20-1 of FIGS. 1 and 2. However, the example method 100 of FIG. 4 may be performed using other computing devices.

Method 100 may include retrieving, at a computing device, a meeting appointment in a calendar application executed by the computing device for a meeting via a communication session (110). The meeting appointment may include identifying information of one or more invitees to the meeting and identifying information for the communication session. The communication session may enable communication between different computing devices. For example, calendar application 11 of computing device 20-1 may schedule an appointment for a communication session. The appointment may identify one or more invitees to the communication session. In some examples, the appointment may be scheduled by a server or a computing device that may manage or host the communication session. Computing devices of invitees to the communication session may receive one or more signals representing the appointment, and may use the one or more signals to locally schedule a corresponding appointment on a calendar application of the computing device. The communication session may be a virtual video conference, or any other type of conference described herein.

Method 100 may further include determining at least one document associated with the communication session (120). As used herein, the word document may refer to any information that can be utilized in a communication session as associated with an appointment, such as an electronic file. A document may include, for example, a computer application, a spreadsheet, a text-based document, or any other resource or artifact. A document may be determined to be associated with a reoccurring communication session based on a previous association of the document with an appointment of a different instance of the communication session.

Method 100 may further include linking the at least one document with the meeting appointment such that a centralized version of the at least one document is accessible to the one or more invitees via the meeting appointment, wherein authorization is granted to each of the one or more invitees to the communication session defining permission levels for each of the one or more invitees to access the at least one document (130). Linking the at least one document associates the document with the meeting. Linking may include providing a data link to the document in the appointment. A data link may be, for example, a uniform resource identifier (URI) or other a string of characters used to identify a computer file, which may be stored locally by the computing device. In an example where the communication session is a reoccurring communication session, a second appointment may be scheduled by the calendar application for the second instance of the reoccurring communication session. Method 100 may further include linking the at least one document with a second meeting notification, wherein the at least one document is accessible through the second meeting notification.

In one example, method 100 further includes outputting, by an output device of the computing device, a meeting notification corresponding with the appointment approximately at or prior to a scheduled time for the appointment, wherein the meeting notification provides a link to access the at least one document. For example, the at least one document is accessible by user 14 through a link the meeting notification, such as document link 74-1 in meeting notification 70 of FIG. 3A. Access to the document (such as read-only, write privileges, etc.) may be authorized based on a status of the invitee. Associating a document with the communication session may include storing a copy of the document in the calendar application, which may be stored with the meeting notification. In other examples, associating a document with the communication session may also include providing a link, such as a URL link, to the document in a calendar appointment or meeting notification.

An announcement page may display names of documents or link to the documents associated with a communication session. The announcement page may also post a new entry containing meeting information for each meeting occurrence. For example, an announcement page may be a blog with time-stamped entries and the ability to be subscribed to through a Really Simple Syndication (RSS) feed.

In addition, when a document (such as a presentation) is associated with an ongoing communication session, permissions for the document may be set for the current participants of the communication session and also may be set for any invitees to the communication session who are not currently participating. For example, if a senior manager was invited to a meeting but was unable to attend, the senior manager may be granted permission to open or otherwise interact with a presentation that was shown during the communication session or read the meeting notes. The senior manage may be able to access these documents through the meeting notification in a calendar application of the senior manager's computing device. Storing documents (including, but not limited to whiteboard, meeting notes, presentations) in a calendar event or meeting notification may allow users to return to the calendar after the communication session and find the appropriate documents, such as action items. In some examples, authorization to access associated documents may be granted by the computing device. Different permission levels may be defined for different invitees. The permission levels may define accessible features of the one or more documents, such as read-only, editing rights, or the like.

Method 100 may further include determining one or more changes made to the at least one document during before the second instance of the reoccurring communication session. Method 100 may additionally include indicating that the one or more changes were made to the at least one document in the second meeting notification. When the one or more changes were made may be determined. Method 100 may further include indicating when the one or more changes were made to the at least one document in the second meeting notification. The at least one document may be updated to reflect a change when any user invited to the communication session makes the change to the document. In some examples, the at least one document is a computer file, and wherein the document is at least one of a presentation, a text-based document, an image, or a spreadsheet. In some examples, method 100 includes, during the communication session, updating the at least one document approximately in real-time as one or more changes are made to the document.

Method 100 may further include receiving, at the computing device, one or more signals related to the communication session, wherein the one or more signals includes information relating to the at least one document, wherein determining at least one document associated with the communication session comprises identifying the at least one document from the one or more signals. In another example, the first computing device may receive one or more signals from a second computing device, wherein the signal invites the first computing device to join the communication session.

A second document may be associated with the communication session, wherein the second document is accessible through the appointment. Method 100 may further include assigning permission to one or more users to access the second document based on whether the one or more users are invitees to the communication session.

In some examples, method 100 may further include determining whether the one or more users are invitees to the communication session based on comparing the one or more users to a list of invitees in the appointment. A name may be determined for the communication session. To invite a second computing device to the communication session, a first computing device may receive one or more signals from a second computing device, wherein the one or more signals represent the name of the communication session. Based on the one or more signals received, the first computing device may invite the second computing device to join the communication session. In some examples, inviting the second computing device to the communication session is further based on an identification of a user of the second computing device.

Method 100 may further include receiving, by a first computing device, a request to join the communication session from a second computing device. Responsive to receiving the request, method 100 may include inviting the second computing device to join the communication session and providing authorization for the second computing device to access the at least one document.

When the communication session is a reoccurring communication session and the meeting notification is a first meeting notification for a first instance of the communication session, method 100 may further include scheduling a second meeting notification in the calendar application. The second meeting notification may be for the second instance of the communication session. Additional instances of the meeting may also be scheduled. The at least one document may also be linked to the second meeting notification. The document may also be accessible through the second meeting notification.

Method 100 may further include determining changes made to the at least one document during or after the first instance of the communication session, but before the second instance of the communication session. If there are any changes, these changes may be logged or otherwise indicated in the second meeting notification. These changes may be included in an additional document.

The documents may be centrally located so one or more authorized users may have access to the documents. If an authorized user makes a change to a document, the updated document may be linked to in the meeting notification. Whenever any authorized user makes an update to the document, the document may be updated for all participants or invitees in the communication session.

Method 100 may also include receiving, at the computing device, a signal to schedule the communication session, wherein the signal comprises information relating to the at least one document, wherein determining at least one document associated with the meeting comprises determining the at least one document from the signal. The signal may be an invitation sent by another computing device to join the communication session.

Frequently meetings are confidential and need specific access controls. It may be desirable that only those users invited to the meeting should have access to artifacts or be allowed to join. A list of invitees in a calendar meeting notification may be used to control who can join a scheduled meeting. If a user is not on the list of invitees, that user may not be able to join the meeting until the user is invited.

If attendees are added dynamically, by invitation during the meeting or communication session, the user may be added to the calendar invitation after the meeting has commenced. This may enable an invited user to have a record of what the user was doing at that time and have access to shared documents. In some examples, a knocking mechanism may be employed for a user who is attempting to join the meeting. The user may be placed on hold until a moderator (or a group of users in the meeting) is prompted to allow the user.

In other examples, method 100 may include user input selecting the network link may be received at the computing device. Responsive to the selection, a web browser may be launched that connects to the document using the network link.

In some examples, one or more communication sessions are confidential, so only invitees to the communication session may have access to one or more documents associated with the communication session. In some examples, non-invited users to the communication session may not be allowed to join the communication session. The communication session host may use a list of invitees in a calendar application to control who may join a scheduled meeting. If a user is not on the list of invitees, that user may not be able to join the meeting until the user is invited. In an example where an invitee to a communication session is added dynamically, by invitation within the communication session, the invitee may be added to the calendar appointment after the communication session began. For example, a calendar appointment may be provided to a newly added use that contains one or more links to one or more documents associated with the communication session. The newly added invitee may be able to access the documents through the calendar appointment. Additionally, a record of what was occurring in the communication session prior to the newly added invitee joining may be available, such as, for example, via an announcement webpage.

Method 100 may further include associating a webpage with the communication session, wherein the appointment includes a link to the webpage. The computing device may upload data related to one or more changes made to the at least one document to the website. In some examples, method 100 includes transcribing, by the computing device, speech received during the communication session into a transcription and uploading the transcription to the webpage.

In some examples, a newly added invitee may be an invitee to the communication session, but using a different computing device than a computing device where the appointment was scheduled. When an invitee is using an unscheduled device to join a communication session, the invitee may input an identification code associated with the communication session in order to join the communication session. An identification code may be a unique alphanumeric, image-based, or audio-based identifier of a communication session. In some examples, an invitee may speak one or more words or sounds, such as a name, to join the communication session.

Storing documents (such as whiteboard, meeting notes, presentations, or the like) in a calendar event may enable invitees or other users of the calendar to find the appropriate documents, such as an action item, after the communication session is completed.

In some examples, the calendar application may provide a list of upcoming meetings. The meetings that are provided in such a list may be at a particular location selected by a user. This user may select a user-interactive element, such as a touch-target, to select a single option to join a meeting.

Frequently, meetings may utilize documents such as agendas, meeting notes, a presentation, a computer file, a text-based document, an image, or a spreadsheet, or other electronic file. These resources may frequently be lost or disorganized. For example, action items from meeting notes can easily be lost from meeting to meeting. Techniques described herein use a calendar application to store documents associated with communication sessions. In one example, a reoccurring meeting (such as reoccurring events in the calendar) may have a single notes document, which may be updated incrementally as meetings are held.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise tangible or non-transitory media. The term "non-transitory" may indicate that the storage medium is not embodied in a carrier wave or a propagated signal. In certain examples, a tangible or non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method, comprising:
    retrieving, at a computing device, a first meeting appointment in a calendar application executed by the computing device for a first instance of a reoccurring meeting via a communication session, wherein the first meeting appointment includes a list of invitees including identifying information of one or more invitees to the meeting and identifying information for the communication session, an invitee of the list of invitees is enabled to join the meeting by entering the identifying information for the communication session, wherein the communication session enables communication with respective scheduled computing devices of the one or more invitees;
    identifying at least one document associated with the communication session;
    linking the at least one document with the first meeting appointment such that a centralized version of the at least one document is accessible to the one or more invitees via a link included in the first meeting appointment in the calendar application;
    linking the at least one document with a meeting notification corresponding with the first meeting appointment, wherein the meeting notification provides the link to access the centralized version of the at least one document;
    granting authorization to the one or more invitees to the communication session defining at least one permission level for each of the one or more invitees based, at least in part, on inclusion in the list of invitees in the first meeting appointment including the identifying information of the one or more invitees to the meeting, to access the communication session, to access the at least one document, and to access document data including identification of at least one of: one or more changes made to the at least one document, identification of a user or a computing device that made each of the at least one or more changes, and a time at which the at least one or more changes were made;
    providing a signal representing the meeting appointment to the respective scheduled computing devices to enable the respective scheduled computing devices to locally schedule a corresponding meeting appointment with the link on a calendar application of the respective schedule computing devices; and
    providing an identification code associated with the communication session to at least one of the one or more invitees to enable access to the communication session from a respective unscheduled device of the at least one of the one or more invitees,
    wherein the one or more invitees are granted authorization based on inclusion in the list of invitees in the first meeting appointment to edit the centralized version of the at least one document, and wherein the at least one document is updated approximately in real-time during the communication session as the one or more changes are made;
    scheduling, at the computing device, a second meeting appointment in the calendar application, wherein the second meeting appointment is for a second instance of the reoccurring meeting; and
    linking the at least one document with a second meeting notification such that the at least one document is accessible through the second meeting notification.

2. The method of claim 1, further comprising:
    determining the one or more changes made to the at least one document before the second instance of the reoccurring meeting; and
    indicating that the one or more changes were made to the at least one document in the second meeting notification.

3. The method of claim 2, further comprising:
    determining when the one or more changes were made to the at least one document; and indicating when the one or more changes were made to the at least one document in the second meeting notification.

4. The method of claim 1, wherein the at least one document is a computer file, and wherein the at least one document is at least one of a presentation, a text-based document, an image, and a spreadsheet, or combinations thereof.

5. The method of claim 1, further comprising:
receiving, at the computing device, one or more signals related to the communication session, wherein the one or more signals include information relating to the at least one document, wherein identifying the at least one document associated with the communication session comprises identifying the at least one document based at least in part on the one or more signals.

6. The method of claim 1, wherein the at least one document comprises a first document, the method further comprising:
identifying at least a second document associated with the communication session; and
linking the second document with the first meeting appointment such that the second document is accessible via the first meeting appointment.

7. The method of claim 1, wherein the computing device comprises a first computing device, the method further comprising:
determining a name to identify the communication session;
receiving, by the first computing device, one or more signals from a second computing device, wherein the one or more signals represent the name of the communication session; and
inviting the second computing device to the communication session based at least in part on the one or more signals.

8. The method of claim 7, wherein inviting the second computing device to the communication session is further based on an identification of a user of the second computing device, the method further comprising:
granting, by the first computing device, a particular permission level to the user of the second computing device that authorizes the user to access the at least one document and to access document data.

9. The method of claim 1, further comprising:
providing a data link to a webpage in the first meeting appointment, wherein the webpage includes information related to the communication session; and
uploading to the webpage, by the computing device, data related to the one or more changes made to the at least one document.

10. The method of claim 9, further comprising:
transcribing, by the computing device, speech received during the communication session into a transcription; and
uploading the transcription to the webpage, by the computing device.

11. The method of claim 1, wherein the computing device comprises a first computing device, the method further comprising:
receiving, by the first computing device, a request to join the communication session from a second computing device;
responsive to receiving the request, inviting the second computing device to join the communication session; and
providing authorization for the second computing device to access the at least one document.

12. A non-transitory computer-readable storage medium comprising instructions for causing at least one processor to perform operations comprising:
retrieving, at a computing device, a first meeting appointment in a calendar application executed by the computing device for a first instance of a reoccurring meeting via a communication session, wherein the first meeting appointment includes identifying information of one or more invitees to the first instance of a reoccurring meeting and identifying information for the communication session, wherein an invitee of the one or more invitees is enabled to join the first instance of a reoccurring meeting by entering the identifying information for the communication session, wherein the communication session enables communication with respective scheduled computing devices of the one or more invitees;
identifying at least one document associated with the communication session;
linking the at least one document with the first meeting appointment such that a centralized version of the at least one document is accessible to the one or more invitees via a link included in the first meeting appointment in the calendar application;
granting authorization to the one or more invitees to the communication session defining at least one permission level for each of the one or more invitees based on inclusion in an invitation list in the first meeting appointment including the identifying information of the one or more invitees to the first instance of a reoccurring meeting, to access the communication session to access the at least one document, and to access document data including identification of at least one of: one or more changes made to the at least one document and identification of a user or a computing device that made each of the at least one or more changes, and a time at which the at least one or more changes were made,
providing a signal representing the first meeting appointment to the respective scheduled computing devices to enable the respective scheduled computing devices to locally schedule a corresponding first meeting appointment with the link on a calendar application of the respective scheduled computing devices;
providing an identification code associated with the communication session to at least one of the one or more invitees to enable access to the communication session from a respective unscheduled device of the at least one of the one or more invitees, wherein the one or more invitees are granted authorization based on inclusion in the invitation list in the first meeting appointment to edit the centralized version of the at least one document, and wherein the at least one document is updated in real-time during the communication session as one or more changes are made;
scheduling, at the computing device, a second meeting appointment in the calendar application, wherein the second meeting appointment is for a second instance of the reoccurring meeting; and
linking the at least one document with a meeting notification such that the at least one document is accessible through the meeting notification.

13. The computer-readable storage medium of claim 12, wherein the computing device comprises a first computing device, and wherein the operations further comprise:

determining a name to identify the communication session;

receiving, by the first computing device, one or more signals from a second computing device, wherein the one or more signals represent the name of the communication session; and inviting the second computing device to the communication session based at least in part on the one or more signals.

14. A computing device, comprising:
a network interface to connect to a communication session, wherein the communication session enables communication between the computing device and one or more scheduled computing devices of one or more invitees; and
one or more processors configured:
- to retrieve a first meeting appointment in a calendar application of the computing device, wherein the first meeting appointment is for a first instance of a reoccurring meeting via the communication session, wherein the first meeting appointment includes identifying information for the communication session, and an invitee of the one or more invitees is enabled to join the first instance of a reoccurring meeting by entering the identifying information for the communication session;
- to determine at least one document associated with the communication session;
- to link the at least one document with the first meeting appointment such that a centralized version of the at least one document is accessible to the one or more invitees via a link included in the first meeting appointment in the calendar application;
- to link the at least one document with a first meeting notification corresponding with the first meeting appointment, wherein the first meeting notification provides the link to access the centralized version of the at least one document;
- to grant authorization to the one or more invitees to the first instance of a reoccurring meeting defining a permission level for the one or more invitees based on inclusion in a list of invitees in the first meeting appointment including the identifying information of the one or more invitees to the first instance of a reoccurring meeting, to access the communication session, to access the at least one document based on inclusion in the list of invitees in the first meeting appointment including the identifying information of the one or more invitees to the first instance of a reoccurring meeting, and to access document data including identification of at least one of: one or more changes made to the at least one document, identification of a user or a computing device that made each of the at least one or more changes, and a time at which the at least one or more changes were made,
- to provide a signal representing the first meeting appointment to the respective scheduled computing devices to enable the respective scheduled computing devices to locally schedule a corresponding first meeting appointment with the link on a calendar application of the respective scheduled computing devices;
- to provide an identification code associated with the communication session to at least one of the one or more invitees to enable access to the communication session from a respective unscheduled device of the at least one of the one or more invitees, wherein the one or more invitees are granted authorization based on inclusion in the list of invitees in the first meeting appointment to edit the centralized version of the at least one document, and wherein the at least one document is updated in real-time during the communication session as one or more changes are made
- scheduling, at the computing device, a second meeting appointment in the calendar application, wherein the second meeting appointment is for a second instance of the reoccurring meeting; and
- linking the at least one document with a second meeting notification such that the at least one document is accessible through the second meeting notification.

15. The computing device of claim 14, wherein the computing device comprises a first computing device, and wherein the one or more processors are further configured to:
determine a name to identify the communication session;
receive, by the first computing device, one or more signals from a second computing device, wherein the one or more signals represent the name of the communication session; and
invite the second computing device to the communication session based at least in part on the one or more signals.

16. The computing device of claim 14, wherein the one or more processors are further configured to:
output, by an output device of the computing device, a first meeting notification including the link to the at least one document, at or prior to a scheduled time for the first instance of a reoccurring meeting, wherein the first meeting notification is a reminder of the first meeting appointment.

* * * * *